United States Patent
Veedu et al.

(10) Patent No.: US 9,051,216 B1
(45) Date of Patent: Jun. 9, 2015

(54) HIGHLY DURABLE COMPOSITE AND MANUFACTURING THEREOF

(75) Inventors: Vinod P. Veedu, Houston, TX (US); Venkat Kanavaram, Honolulu, HI (US)

(73) Assignee: Oceanit Laboratories, Inc., Honolulu, HI (US)

(*) Notice: Subject to any disclaimer, the term of this patent is extended or adjusted under 35 U.S.C. 154(b) by 694 days.

(21) Appl. No.: 13/090,933

(22) Filed: Apr. 21, 2011

Related U.S. Application Data

(60) Provisional application No. 61/342,807, filed on Apr. 20, 2010.

(51) Int. Cl.
C04B 28/04 (2006.01)
C04B 14/02 (2006.01)

(52) U.S. Cl.
CPC ............... C04B 28/04 (2013.01); C04B 14/026 (2013.01)

(58) Field of Classification Search
CPC .... C04B 28/04; C04B 14/026; C04B 20/006; C04B 20/008; C04B 22/147; C04B 22/04; C04B 22/124
USPC ............. 106/644, 717, 819; 423/447.1, 447.2
See application file for complete search history.

(56) References Cited

U.S. PATENT DOCUMENTS

| | | | |
|---|---|---|---|
| 5,755,876 A * | 5/1998 | Stokes et al. | 106/739 |
| 5,985,011 A * | 11/1999 | Foltz et al. | 106/14.05 |
| 6,022,408 A * | 2/2000 | Stokes et al. | 106/739 |
| 6,280,697 B1 * | 8/2001 | Zhou et al. | 423/414 |
| 6,852,410 B2 * | 2/2005 | Veedu et al. | 428/367 |
| 6,872,330 B2 * | 3/2005 | Mack et al. | 252/378 R |
| 6,911,260 B2 | 6/2005 | Ren et al. | |
| 7,071,406 B2 * | 7/2006 | Smalley et al. | 136/252 |
| 7,288,238 B2 * | 10/2007 | Smalley et al. | 423/447.1 |
| 7,666,327 B1 * | 2/2010 | Veedu | 252/510 |
| 7,713,448 B1 * | 5/2010 | Veedu | 252/506 |
| 7,854,945 B2 * | 12/2010 | Fischer et al. | 424/491 |
| 7,867,468 B1 * | 1/2011 | Haddon et al. | 423/447.1 |
| 7,875,211 B1 * | 1/2011 | Veedu | 252/506 |
| 7,985,354 B1 * | 7/2011 | Veedu | 252/511 |
| 8,128,835 B2 * | 3/2012 | Stokes et al. | 252/70 |
| 8,585,934 B2 * | 11/2013 | Shah et al. | 252/502 |
| 2003/0004058 A1 | 1/2003 | Li et al. | |
| 2004/0234566 A1 | 11/2004 | Qiu et al. | |
| 2005/0079118 A1 * | 4/2005 | Maruyama et al. | 423/447.3 |
| 2005/0100501 A1 * | 5/2005 | Veedu et al. | 423/447.2 |
| 2006/0029537 A1 | 2/2006 | Zhang et al. | |
| 2006/0039848 A1 | 2/2006 | Matarredona et al. | |

(Continued)

FOREIGN PATENT DOCUMENTS

WO 2007010517 A1 1/2007

OTHER PUBLICATIONS

Tsang S.C. et al., A simple chemical method of opening and filing carbon nanotubes, Nature 1994 vol. 372: 159-162.

*Primary Examiner* — Paul Marcantoni
(74) *Attorney, Agent, or Firm* — James Creighton Wray

(57) ABSTRACT

Lithium compound functionalized carbonaceous materials are dispersed in a homogenous aqueous mixture. The mixture is dispersed in water used to mix cement and aggregate and remain dispersed in the cement. Spraying the aqueous mixture over cracked or damaged concrete surfaces fill the cracks or damages with the functionalized nanotubes. The solution solves problems of concrete permeability, eliminates alkali-silica reactions, avoids shrinkage and thermal stress and improves durability of concrete.

19 Claims, 1 Drawing Sheet

(56) References Cited

U.S. PATENT DOCUMENTS

| | | |
|---|---|---|
| 2006/0159916 A1 | 7/2006 | Dubrow et al. |
| 2007/0077432 A1 | 4/2007 | Nagasaki et al. |
| 2007/0128960 A1 | 6/2007 | Nejhad et al. |
| 2007/0142548 A1 | 6/2007 | Nejhad et al. |
| 2007/0298168 A1 | 12/2007 | Ajayan et al. |
| 2008/0134942 A1* | 6/2008 | Brenner et al. ............... 106/672 |
| 2008/0277652 A1 | 11/2008 | Mochizuki et al. |
| 2009/0039308 A1 | 2/2009 | Gounko et al. |
| 2009/0142581 A1 | 6/2009 | Heintz et al. |
| 2009/0229494 A1* | 9/2009 | Shah et al. .................... 106/816 |
| 2011/0219607 A1* | 9/2011 | Nanjundaswamy et al. 29/623.1 |

* cited by examiner

HIGHLY DURABLE COMPOSITE AND MANUFACTURING THEREOF

This application claims the benefit of U.S. Provisional Application No. 61/342,807, filed Apr. 20, 2010, which is hereby incorporated by reference in its entirety as if fully set forth herein.

The disclosure of U.S. patent application Ser. No. 11/904,247, filed Sep. 25, 2007, now U.S. Pat. No. 7,713,448 and U.S. Continuation application Ser. No. 12/661,600, filed Mar. 19, 2010 entitled Carbon Nanomaterials Dispersion and Stabilization, are hereby incorporated by reference in their entireties as if fully set forth herein.

SUMMARY OF THE INVENTION

Concrete structures have to sustain extreme conditions in service life and are plagued with serious problems reducing their durability. Nanostructures like carbon nanotubes (CNTs) can address several of the concrete problems without significantly modifying its composition and manufacturing aspects. Carbon nanotubes with excellent physical and chemical properties find application in various technological fields. The major shortcomings of concrete include shrinkage, thermal stresses, cracks due to alkali-silica reaction (ASR), and permeability leading to corrosion of rebars. There have been numerous remedies to each of these problems in the form of admixtures, however, there is no single admixture addressing all these issues.

Oceanit's novel approach of using hybrid nanostructure based admixture answers several of the above mentioned critical issues. Oceanit's admixture is composed of hybrid nanostructures dispersed in water prior to mixing in concrete. The admixture mixes thoroughly with the other ingredients of concrete without affecting the overall chemistry and hydration process.

The new hybrid structures include CNTs decorated and functionalized both on inner and outer surfaces with lithium compounds, such as $LiNO_3$, $Li_2CO_3$, LiF, LiCl and $Li_2SO_4$.

The new hybrid nanostructures afford physical and chemical properties of CNTs along with the properties of the additive materials. Carbon nanotubes are strongest carbon fibers with exceptionally high Young's modulus about 5× that of steel which impart superior mechanical properties to concrete. The high aspect ratio of CNTs result in reactive surface areas for surface modification. Moreover, CNTs are corrosion and oxidation resistant.

The advantages afforded by the hybrid nanostructure based admixture include: (a) low permeability, (b) low shrinkage and thermal stresses, and (c) mitigation and elimination of ASR related damages. The hybrid nanostructure admixture is composed of nanoscale filler materials that exhibit very high surface area and excellent dispersion, thereby significantly improving the packing density of concrete. High packing density ensures low permeability which controls the damages caused by atmospheric gases (e.g., $CO_2$, chlorides and sulphates) and moisture. Hydrophobic nature of CNTs prevents moisture from permeating through cracks to prevent further damage through corrosion of rebars. CNTs have negative coefficient of thermal expansion and very high thermal conductivity which can counterbalance the volumetric variations and thermal stresses encountered by concrete during extreme weather conditions.

To mitigate and control alkali-silica-reactivity in concrete the admixture incorporates lithium based compounds decorated and functionalized onto the nanoscale filler materials. The lithium compound functionalized and decorated nanostructures well dispersed in concrete are very efficient in controlling the premature deterioration caused by ASR. Essentially, lithium reacts with reactive silica of the aggregates in concrete to form lithium-silica gel which is non-expansive and nondestructive.

The new hybrid nanomaterial admixture has a significant commercial value based on its multi-functional properties for enhanced durability of concrete.

Based on existing literature there is no commercial or scientific document that relates to the development of a single admixture for addressing more than one critical issue affecting concrete either during manufacturing or in service. There are several admixtures by different admixture manufacturing companies addressing acceleration or retardation of setting, shrinkage, water reduction, ASR and many other issues, but each is for a specific task. Examples of the admixtures for addressing ASR related issue are listed below.

W. R. Grace Co. RASIR™ is a commercial liquid admixture to mitigate and control ASR in concrete when using high or moderate-alkali cement. RASIR is a 30 wt. % solution of lithium nitrate in water.

Euclid Chemical Co. EUCON INTEGRAL ARC is a lithium nitrate based specially formulated admixture to control alkali-silica reactivity (ASR) in concrete. Eucon Integral Arc is a 40 wt. % solution of lithium nitrate in water.

BASF Chemical Co., ASRx 30 LN lithium based, liquid admixture is formulated for use in high-alkali concrete containing reactive aggregates to inhibit and control alkali-silica reactivity (ASR). ASRx 30LN is 30 wt. % solution of lithium nitrate in water.

Oceanit's new hybrid nanomaterial admixture is unique compared to all other currently available admixtures, since the novel nanomaterial admixture addresses several critical problems affecting the durability of concrete e.g., permeability, shrinkage, thermal stresses and ASR damages.

Commercial admixtures for ASR mitigation are simple mixtures of lithium nitrate in water either mixed with concrete while casting or sprayed over damaged concrete structures to control further ASR damages.

An efficient control of ASR depends on effective distribution of lithium compounds in concrete. Oceanit's admixture is composed of a homogeneous solution of lithium compound decorated CNTs in water; hence distribution of lithium compound decorated CNTs in concrete is uniform which can efficiently mitigate and control alkali-silica reactivity. Moreover, uniform distribution of nanostructure admixture reduces the quantity of lithium compounds required to address ASR in concrete.

The invention provides a hybrid nanomaterial admixture for addition to concrete. Nanostructures functionalized (decorated) with lithium compound and adapted for addition to concrete. The hybrid nanomaterial admixture of nanostructures functionalized with lithium compound is suspended in an aqueous phase and mixed with a slurry of cement, sand and aggregate before pouring the slurry into forms. The new admixture of nanostructures functionalized with lithium compound provides low permeability, low shrinkage, low thermal stresses, mitigation and elimination of alkali-silica reactions, and improved durability of the concrete.

In another embodiment, the new hybrid nanomaterial admixture of nanostructures functionalized with lithium compound is homogenized in an aqueous phase and is distributed over a surface of concrete. The nanostructures migrate into and fill the fine cracks and carry the lithium compound into the cracks. The admixture prevents permeation of water into the cracks and prevents further alkali-silica reaction.

The new nanomaterial admixture of nanostructures functionalized with lithium compound provides at the same time low permeability, low shrinkage and thermal stresses, mitigation and elimination of alkali-silica reaction, an improved durability of the concrete and fills cracks in the concrete.

The nanostructures comprise carbon nanotubes in one embodiment. The lithium compound may be selected from $LiNO_3$, $Li_2CO_3$, LiF, LiCl and $Li_2SO_4$ and other lithium compounds and combinations thereof.

This invention provides as a new product a solution of nanomaterials functionalized with lithium compound for use in or on concrete. In one embodiment of the product, the nanomaterials are carbon nanotubes, and the lithium compound is $LiNO_3$, $Li_2CO_3$, LiF, LiCl, $Li_2SO_4$ or other lithium compound or combinations thereof.

The solution is a homogenous aqueous mixture of the carbon nanotubes functionalized with the lithium compound and has about 30% by weight of the lithium compound in relation to a total weight of the carbon nanotubes and lithium compound mixture.

A new process of the invention includes applying lithium functionalized nanostructures to concrete. The new process aids in reducing or eliminating problems of concrete shrinkage, thermal stresses and cracks due to alkali-silica reaction in the concrete. The applying the lithium functionalized nanostructures includes applying the lithium functionalized nanostructures to water used in creating a slurry of cement, and aggregate before pouring the slurry and forming and setting the concrete. The lithium functionalized nanostructures mix thoroughly with ingredients of the slurry without affecting overall chemistry and hydration of the slurry and the resulting concrete.

In one form of the invention, the applying the lithium functionalized nanostructures to the concrete includes coating a surface of the concrete with the lithium functionalized nanostructures. The coating of the surface of concrete with the lithium functionalized nanostructures includes spraying an aqueous solution of the lithium functionalized nanostructures over the surface of concrete.

The coating also includes spraying an aqueous solution of the lithium functionalized nanostructures over a surface of damaged concrete. The applying the lithium functionalized nanostructures comprises applying a homogenous aqueous solution of lithium compound functionalized carbon nanotubes.

The new applying the lithium functionalized nanostructures includes applying a homogenous aqueous solution of carbon nanotubes functionalized with lithium compound, such as $LiNO_3$, $Li_2CO_3$, LiF, LiCl and $Li_2SO_4$. The lithium compound is about 30% by weight of a total weight of the carbon nano tubes and the lithium compound.

These and further and other objects and features of the invention are apparent in the disclosure, which includes the above and ongoing written specification, with the claims and the drawings.

DETAILED DESCRIPTION OF THE DRAWINGS

Figure 1:
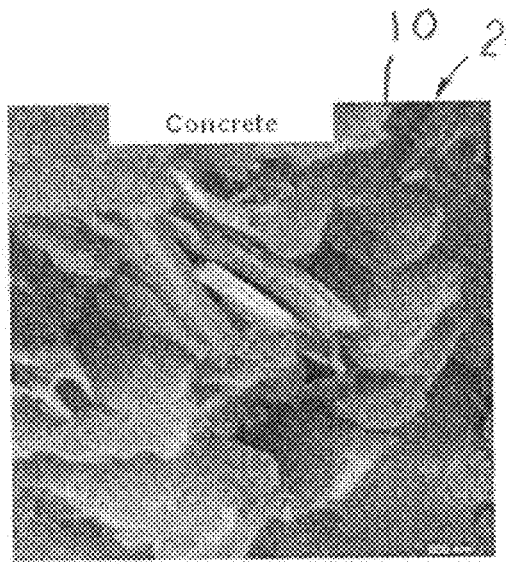
FIG. 1 is a micrograph of set concrete.

FIG. 1 is a micrograph showing concrete particles 10 in a structure 20.

Figure 2:
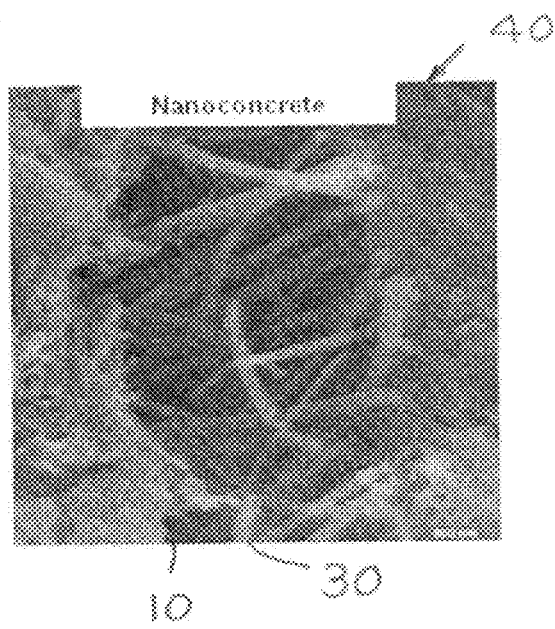
FIG. 2 is a micrograph showing the effect of CNTs on concrete.

FIG. 2 is a micrograph showing the effect of CNTs on concrete. The CNTs 30 are dispersed throughout the concrete structure 40.

Figure 3:
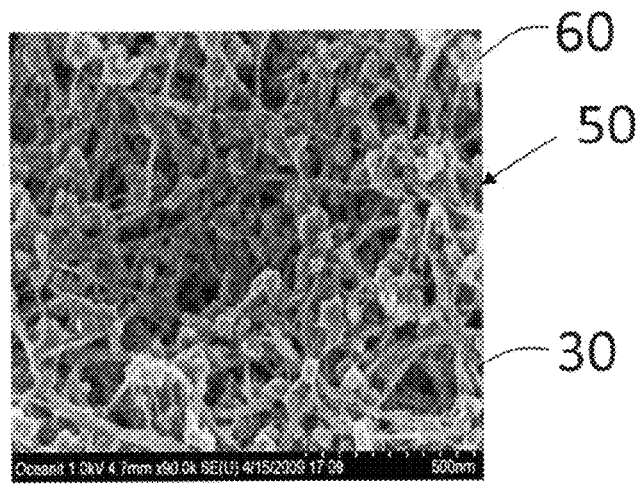
FIG. 3 is a micrograph of lithium compound functionalized (decorated) CNTs (~30 wt. % of $LiNO_3$).

FIG. 3 is a micrograph 50 of lithium compound 60 decorated CNTs 30. Lithium compound functionalized CNTs 60 dispersed in an aqueous solution are sprayed over the surfaces of a new or damaged concrete body. The lithium compound functionalized (decorated) CNTs 60 migrate over the surfaces, coating the surfaces, and flow into micro cracks and larger cracks to mitigate and prevent ASR.

When mixing CNTs functionalized with lithium compounds, the CNT lithium compound mixture is mechanically stirred and is added to the water used in creating a cement and aggregate slurry. The functionalized CNTs are distributed uniformly throughout the slurry, and the cement hardens around the CNT's and lithium compound.

A single (Oceanit's hybrid nanomaterial admixture) admixture addresses several critical problems affecting the durability in concrete. The current invention addresses permeability, shrinkage, thermal stresses and ASR damages encountered in concrete. Moreover, there is no commercial admixture that addresses more than one of the concrete problems. Essentially they address only one specific problem at any given time.

While the invention has been described with reference to specific embodiments, modifications and variations of the invention may be constructed without departing from the scope of the invention, which is defined in the following claims.

We claim:

1. A composition comprising cement and a hybrid nanomaterial admixture, the hybrid nanomaterial further comprising nanostructures functionalized with lithium compound, and the admixture is an addition to cementitious materials or concrete.

2. The composition of claim 1, wherein water, sand and aggregate are added to the admixture of cement and nanostructures functionalized with lithium compound and wherein the admixture is suspended in an aqueous phase and mixed with slurry of the sand and aggregate before pouring the slurry into forms.

3. The composition of claim 2, wherein the admixture of cement and nanostructures functionalized with lithium compound in the water, sand and aggregate provides reduced permeability, reduced shrinkage, reduced thermal stresses, mitigation and elimination of alkali-silica reactions, and enhanced durability of resultant concrete.

4. The composition of claim 1, wherein water is added and the admixture of cement and nanostructures functionalized with lithium compound is suspended in an aqueous phase and is distributed over a surface of concrete.

5. The composition of claim 4, wherein water and cementitious materials added to the admixture of cement and nanostructures functionalized with lithium compound provide reduced permeability, reduced shrinkage and thermal stresses, mitigation and elimination of alkali-silica reaction, an enhanced durability of the concrete and fills cracks in resultant concrete.

6. The composition of claim 1, wherein the nanostructures comprise functionalized carbonaceous nanomaterials, carbon nanotubes, nanoparticles, graphite or graphene structures.

7. The composition of claim 6, wherein the lithium compound is selected from the group consisting of $LiNO_3$, $Li_2CO_3$, LiF, LiCl and $Li_2SO_4$ or combinations thereof.

8. A composition comprising an aqueous solution of cementitious materials and carbonaceous nanomaterials functionalized with lithium compound for use in or on concrete.

9. The composition of claim 8, wherein the carbonaceous nanomaterials are carbon nanotubes and the lithium compound is selected from the group consisting of $LiNO_3$, $Li_2CO_3$, LiF, LiCl, $Li_2SO_4$ or other lithium compound or combinations thereof.

10. The composition of claim 8, wherein the solution is a homogenous aqueous mixture of the cementitious materials and the carbonaceous materials, which are nanotubes, nanoparticles, graphite or graphene materials functionalized with the lithium compound has about 1-50% by weight of the lithium compound in relation to a total weight of the combined carbon nanomaterials and the lithium compound mixture.

11. A process comprising applying an aqueous solution of cement and lithium functionalized nanostructures to concrete.

12. The process of claim 11, further comprising reducing or eliminating problems of concrete shrinkage, thermal stresses and cracks due to alkali-silica reaction in the concrete by the applying of the aqueous solution to the concrete.

13. The process of claim 11, wherein the applying the lithium functionalized nanostructures comprises applying the lithium functionalized nanostructures to water used in creating a slurry of cement, and aggregate before pouring the slurry and forming and setting the concrete.

14. The process of claim 13, wherein the lithium functionalized nanostructures mix thoroughly with ingredients of the slurry without affecting overall chemistry and hydration of the slurry and the resulting concrete.

15. The process of claim 11, wherein the applying the lithium functionalized nanostructures to the concrete comprises coating a surface of the concrete with the lithium functionalized nanostructures.

16. The process of claim 15, wherein the coating the surface of concrete with the lithium functionalized nanostructures comprises spraying an aqueous solution of the lithium functionalized nanostructures over the surface of concrete.

17. The process of claim 15, wherein the coating the concrete with the lithium functionalized nanostructures comprises spraying an aqueous solution of the lithium functionalized nanostructures over a surface of damaged concrete.

18. The process of claim 11, wherein the applying the lithium functionalized nanostructures comprises applying a homogenous aqueous solution of lithium compound functionalized carbon nanotubes.

19. The process of claim 11, wherein the applying of the lithium functionalized nanostructures comprises applying a homogenous aqueous solution of the carbon nanotubes functionalized with lithium compound, selected from the group consisting of $LiNO_3$, $Li_2CO_3$, LiF, LiCl and $Li_2SO_4$, or other lithium compound or combination wherein the lithium compound is about 1-50% by weight of a total combined weight of the carbon nanotubes and the lithium compound.

* * * * *